United States Patent [19]

Shinki et al.

[11] Patent Number: 5,372,050
[45] Date of Patent: Dec. 13, 1994

[54] SHIFT DEVICE FOR AUTOMATIC TRANSMISSION

[75] Inventors: Hiroyuki Shinki, Nishimiya; Hidemi Aoki, Higashihiroshima; Kouki Makino, Hiroshima, all of Japan

[73] Assignee: Mazda Motor Corporation, Hiroshima, Japan

[21] Appl. No.: 27,538

[22] Filed: Mar. 8, 1993

[30] Foreign Application Priority Data

Mar. 6, 1992 [JP] Japan .................. 4-084934
Mar. 31, 1992 [JP] Japan .................. 4-108889

[51] Int. Cl.$^5$ .................. F16H 59/02; F16H 63/38
[52] U.S. Cl. .................. 74/473 SW; 74/473 R; 74/475; 180/336
[58] Field of Search .............. 74/473 R, 473 SW, 475; 180/336

[56] References Cited

U.S. PATENT DOCUMENTS

| | | | |
|---|---|---|---|
| 2,821,090 | 1/1958 | McCordic | 74/473 R |
| 2,884,802 | 5/1959 | Loofbourrow | 74/473 R |
| 2,964,964 | 12/1960 | Craig | 74/473 R |
| 3,301,086 | 1/1967 | Williams et al. | 74/475 |
| 3,465,559 | 9/1969 | Rhodes et al. | 74/473 R X |
| 3,765,262 | 10/1973 | Mendenhall et al. | 74/473 R |
| 4,365,522 | 12/1982 | Kubota et al. | 74/475 |
| 4,645,046 | 2/1987 | Takano et al. | 74/475 X |
| 4,942,937 | 7/1990 | Amberger et al. | 192/4 A X |

FOREIGN PATENT DOCUMENTS 1965526 7/1971 Germany .................. 74/473 SW
60-10911 4/1985 Japan .

Primary Examiner—Allan D. Herrmann
Attorney, Agent, or Firm—Keck, Mahin & Cate

[57] ABSTRACT

An automatic transmission shift device has a shift lever extending from a dashboard toward and near a transverse extremity of a steering wheel and movable at least in a vertical direction to shift an automatic transmission into any desired range. The shift lever is operated or pushed up and down in the vertical direction with a vertical operational power between approximately 10 and 15% of an average maximum muscular kinetic power actively available in the vertical direction of arms of average drivers.

26 Claims, 14 Drawing Sheets

| FACTORS | I | II | III | IV | V | VI | METHOD | INSTRUMENT |
|---|---|---|---|---|---|---|---|---|
| HUMAN CHARACTERISTICS | | | | | | | | |
| PHYSICAL CHARACTERISTICS | O | O | | | O | O | | |
| MENTAL CHARACTERISTICS | | | O | O | | | | |
| PHYSIOLOGICAL CHARACTERISTICS | | | | | | | | |
| | ① | ③ | ④ | ⑤ | ⑥ | ⑦ | MOTION ANALYSIS | VIDEO CAMERA |
| | | | | | | | MYOELECTRIC POTENTIAL | ELECTRICMYOGRAM |
| | | | | | | | MAXIMUM MUSCULER POWER MEASUREMENT | LOAD CELL |
| | | | | | | | OPERATION TIME MEASUREMENT | HIGH SPEED VIDEO CAMERA |

FIG. 9

SHIFT DEVICE FOR AUTOMATIC TRANSMISSION

BACKGROUND OF THE INVENTION

1. Field of the Invention

This invention relates to a shift device for an automatic transmission of an automobile, and, more particularly, to an automatic transmission shift device which can be operated with better feeling.

2. Description of Related Art

Typically, automatic transmission shift devices are provided inside a console between front bucket seats. Although such a shift device has a superior operability, it narrows the floor space and interferes with a passenger's foot space. Alternatively, another type of automatic transmission shift device is mounted on an instrument panel or dashboard. Such a dashboard mounted type of shift device has a shift or select lever extending upwardly slanting backwardly usually at a small angle with respect to the vertical direction. Some shift levers of this type are provided at the middle of their shafts with shock absorber means to absorb a great deal of the kinetic energy generated in a frontal crash. The shift lever, passing through the dashboard and extending almost vertically, is pushed and pulled or moved back and forth in order to select desired ranges. Such a dashboard type shift device is known from, for instance, Japanese Unexamined Utility Model Publication No. 60-10911.

The dashboard type shift lever of the automatic transmission shift device described in the publication mentioned above is located relatively far from a steering wheel, and hence, it has a poor operability. In order to improve the operability of a shift lever, it may be incorporated extending almost horizontally rearward from a front panel portion of the dashboard so as to be operated up and down.

Since, generally, a human arm is considered as poor in moving an object approximately vertically up and down as opposed to moving an object approximately horizontally back and forth, a horizontal shift lever compares unfavorably with a floor mounted type shift lever. In order for a dashboard mounted type horizontal shift lever to provide a feeling of shift operation as favorable as the floor mounted type shift lever while preventing the driver from experiencing fatigue of his or her arm, it is very important to enable the shift device, including the shift lever, to be operated with the most appropriate physical power and motion of the human arm.

SUMMARY OF THE INVENTION

It is therefore an object of the present invention to provide a shift device, for an automatic transmission of an automotive vehicle, having a shift lever which extends from a dashboard near a transverse extremity of a steering wheel and which can be operated with the same feeling as a floor mounted shift lever.

The foregoing object of the present invention is accomplished by providing an automatic transmission shift device which has a shift lever extending from a dashboard toward and near a transverse extremity of a steering wheel and being movable at least in a vertical direction to shift the automatic transmission into any desired range. The shift device is designed and adapted so that the shift lever is operated or pushed up and down in the vertical direction with a vertical operational power between approximately 10 and 15% of an average maximum muscular kinetic power actively available in the vertical direction of arms of average drivers. Since ordinary floor shift levers are operated or moved back and forth with a horizontal power within approximately 10 to 15% of an average maximum muscular kinetic power available in horizontal direction of arms of average drivers, the shift lever of the present invention provides the same feeling of operation as the ordinary floor shift levers. The shift lever is also operated or pushed aside in a transverse direction with a transversely operational power higher than the vertical operational power.

In the case that the shift lever has a large stroke for shifting the automatic transmission into possible ranges, the vertical operational power is decreased with an increase in down movement of the shift lever.

BRIEF DESCRIPTION OF THE DRAWINGS

The above and other objects and features of the present invention will be clearly understood from the following detailed description with respect to preferred embodiments thereof when considered in conjunction with the accompanying drawings, in which:

FIG. 9 is a diagram for analysis of shift lever operability;

DETAILED DESCRIPTION OF THE PREFERRED EMBODIMENT

Because automatic transmissions are well known, the present description will be directed in particular to elements forming part of, or cooperating directly with, a shift device in accordance with the present invention. It is to be understood that parts or elements not specifically shown or described can take various forms well known to those skilled in the automobile art.

The term "transverse" as used herein shall mean and refer to the direction in which the car body extends from side to side.

Figure 1:
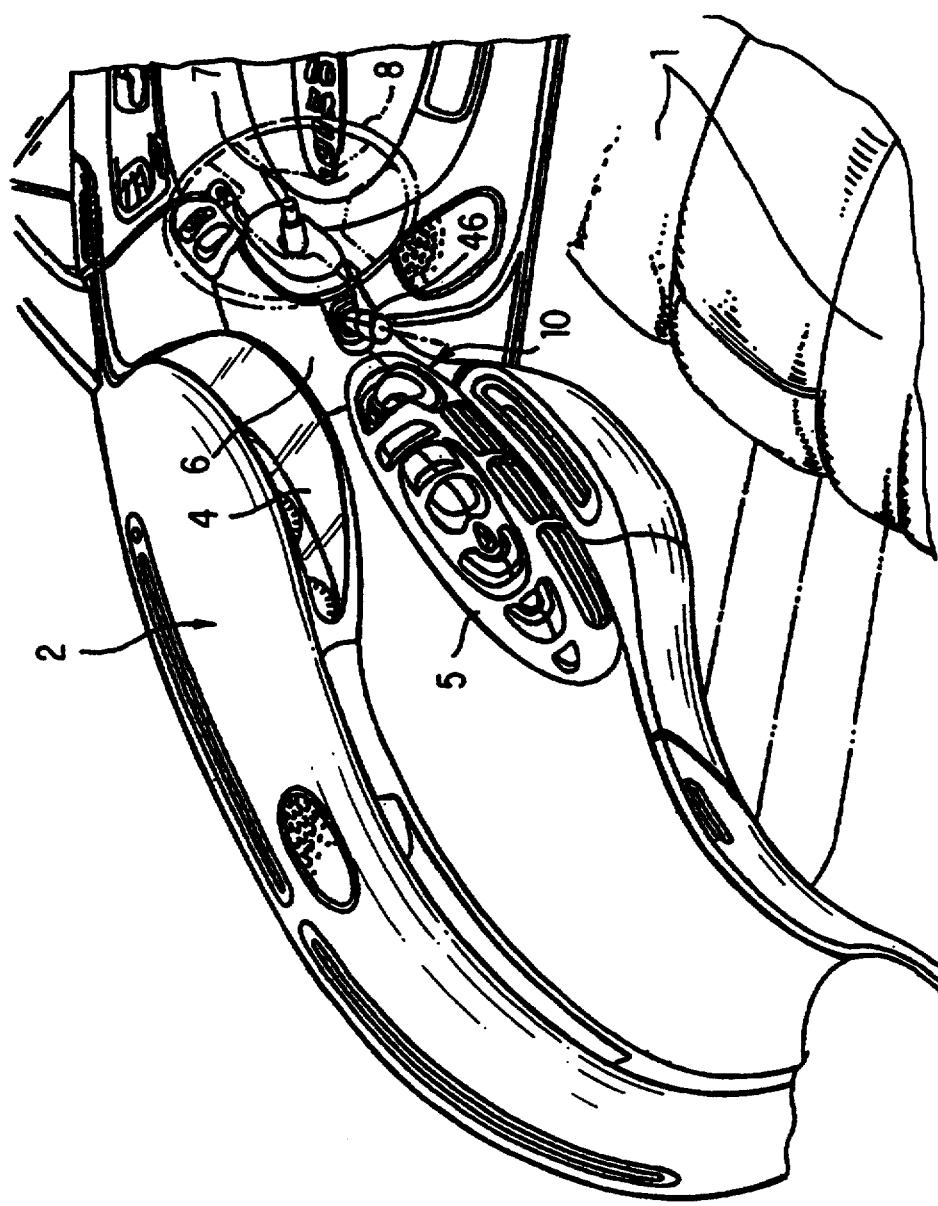
FIG. 1 is a perspective illustration showing a part of a front compartment of a car provided with a shift device in accordance with a preferred embodiment of the present invention.
Figure 2:
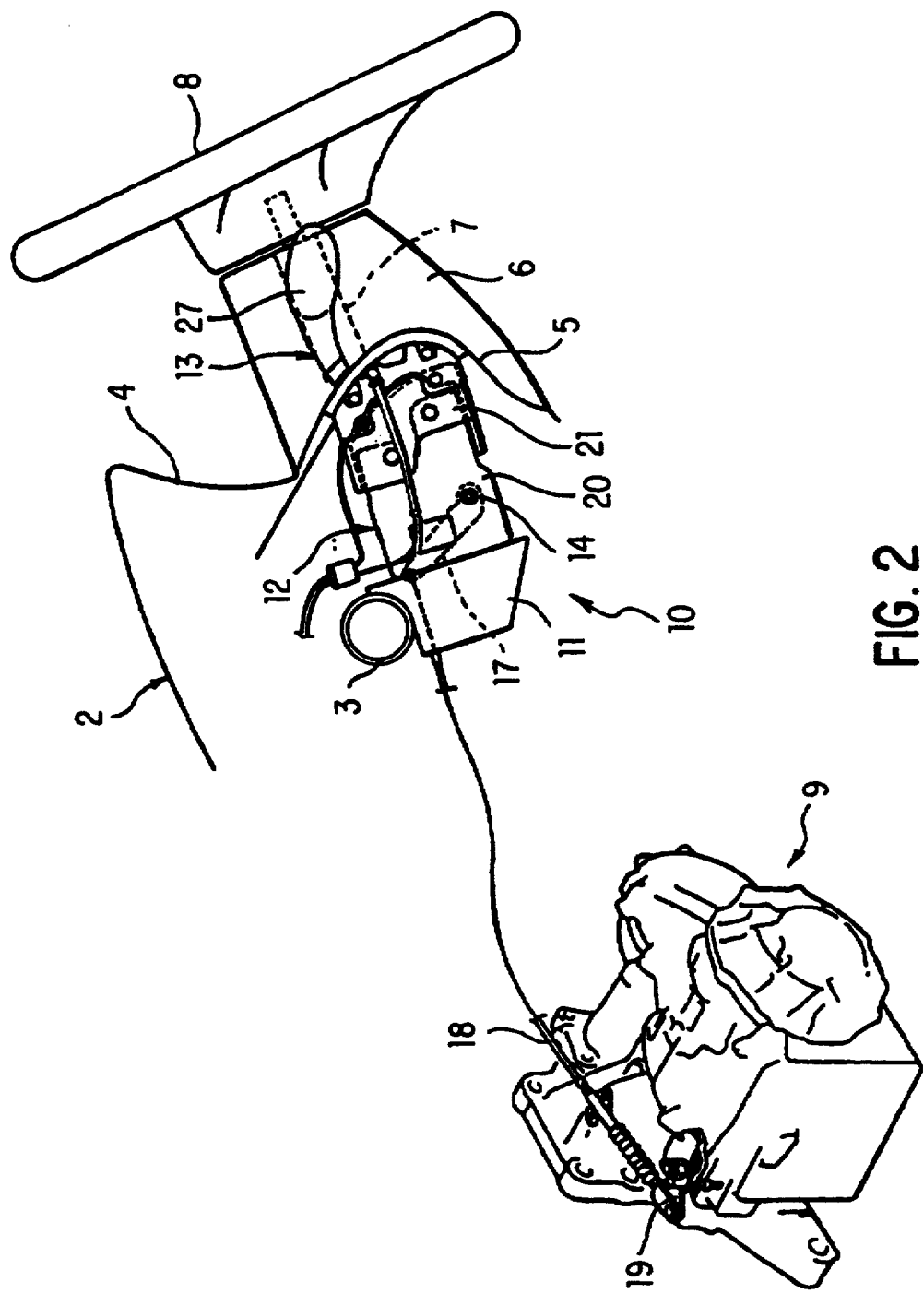
FIG. 2 is a schematic illustration of the shift device operationally connected to an automatic transmission.

Referring to the drawings in detail, and in particular, to FIG. 1 showing a part of a compartment of a car for right-hand steering, an instrument panel or dashboard 2 is positioned in front of front seats 1. Inside the dashboard 2 there is provided a transversely extending beam 3, forming part of a supporting frame of the instrument dashboard 2, secured at its opposite ends to pillars (not shown) to which front doors (not shown) are hinged. At an upper portion, the dashboard 2 is formed with various meters or dials 4 at its upper right portion. The dashboard 2 is further formed with a center expansion 5. On the right side of center expansion 5 a steering column 6 extends upward back up from the dashboard 2 in and by which a steering shaft 7 with a steering wheel 8 is rotatably supported. A transmission shift device 10 is located on the right side of the center expansion 5 and closely to the left extremity of the steering wheel 8.

As shown in FIGS. 2–8, the transmission shift device 10, having a main shift mechanism 12 and a shift lever 13 (which is referred to as a dashboard shift lever), is secured to the transverse beam 3 by means of a bracket 11 and is generally inclined upward and back at a small angle with respect to a horizontal plane. The dashboard shift lever 13 extends rearward toward the steering wheel 8. The main shift mechanism 12, which is located inside the expansion 5 of the dashboard 2, has a lever mounting structure 16 which rotatably mounts the dashboard shift lever 13 therein so that it turns around both first and second shafts 14 and 15 which, in turn, spatially intersect at a right angle. The first shaft 14 extends lengthwise approximately in a horizontal plane. The lever mounting structure 16 has an output lever 17 that connects or transmits the turning motion of the dashboard shift lever 13 about the first shaft 14 to a shift valve of a hydraulic control system for the automatic transmission 9 through a push-pull wire 18 connected to a shift valve actuator mechanism 60 via a connecting arm 19 so as to selectively shift the transmission 9 to desired ranges, such as a park (P) range, a reverse (R) range, a neutral (N), a drive (D) range, a second (2nd) and a first (1st) range.

The dashboard shift lever 13 is comprised by a lever or shaft 26, extending in an approximately straight line in the lengthwise or axial direction, and a knob 27, made of an elastic plastic material, such as, formed urethane or synthetic rubber covered by leather, attached to the rear or free end of the lever 26. The lever 26 has its rear end 26a slightly bent laterally displaced away from the steering shaft 7 so as to serve as a cushioning means. The knob 27 is slightly curved so as to locate its grip portion 27a laterally displaced away from the steering shaft 7 even more than the lever 26.

Figure 7:
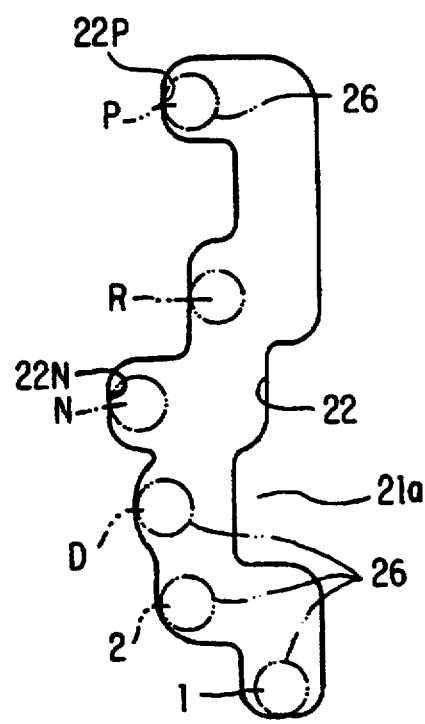
FIG. 7 is an enlarged expanded view of a guide slot for a shift lever of the shift device.

The main shift mechanism 12 is housed within a front casing 20 and a rear casing 21 fitted in the front casing 20. The front casing 20 is secured to and extends rearward from the bracket 11. A rear wall 21a of the rear casing 21 is convex to the adjacent dashboard 2. The rear wall 21a of the rear casing 21 is covered by an ornamental face panel 23 secured thereto by means of a panel securing frame 24 with a frame wall 24a. The face panel 23 and the frame 24 are curved, matching in shape with the curved rear wall 21a of the rear casing 21. The rear wall 21a of the rear casing 21 and the face panel 23 are, respectively, formed with slot 22 and 25, zig-zag shaped as shown in FIG. 7, in which the dashboard shift lever 13 is movable up and down and is positioned in specified positions for various ranges, such as a park (P) range, a reverse (R) range, a neutral (N) range, a drive (D) range, a second (2nd) range and a first (1st) range.

Figure 3:
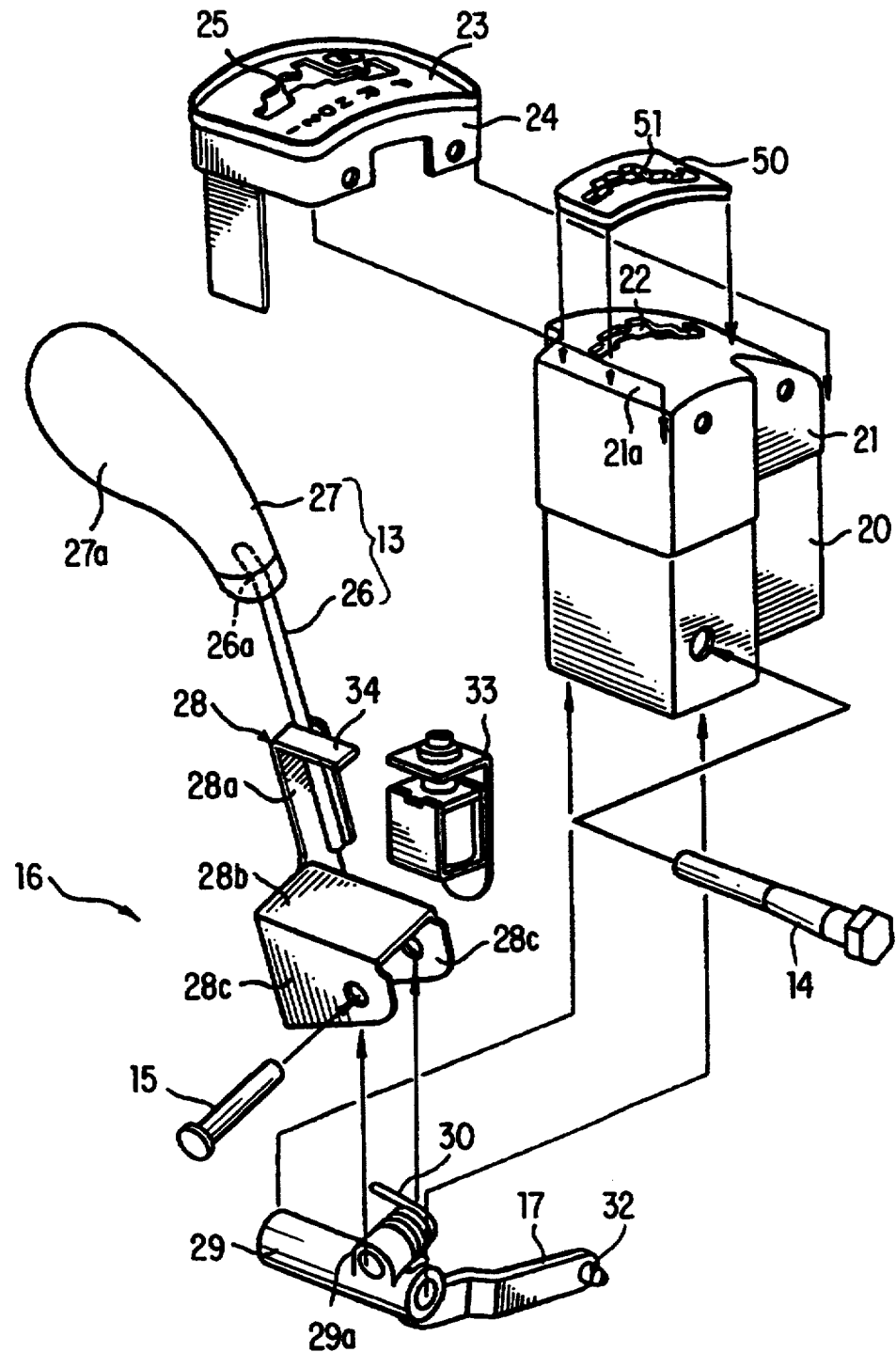
FIG. 3 is a perspective exploded view of the shift device.
Figure 4:
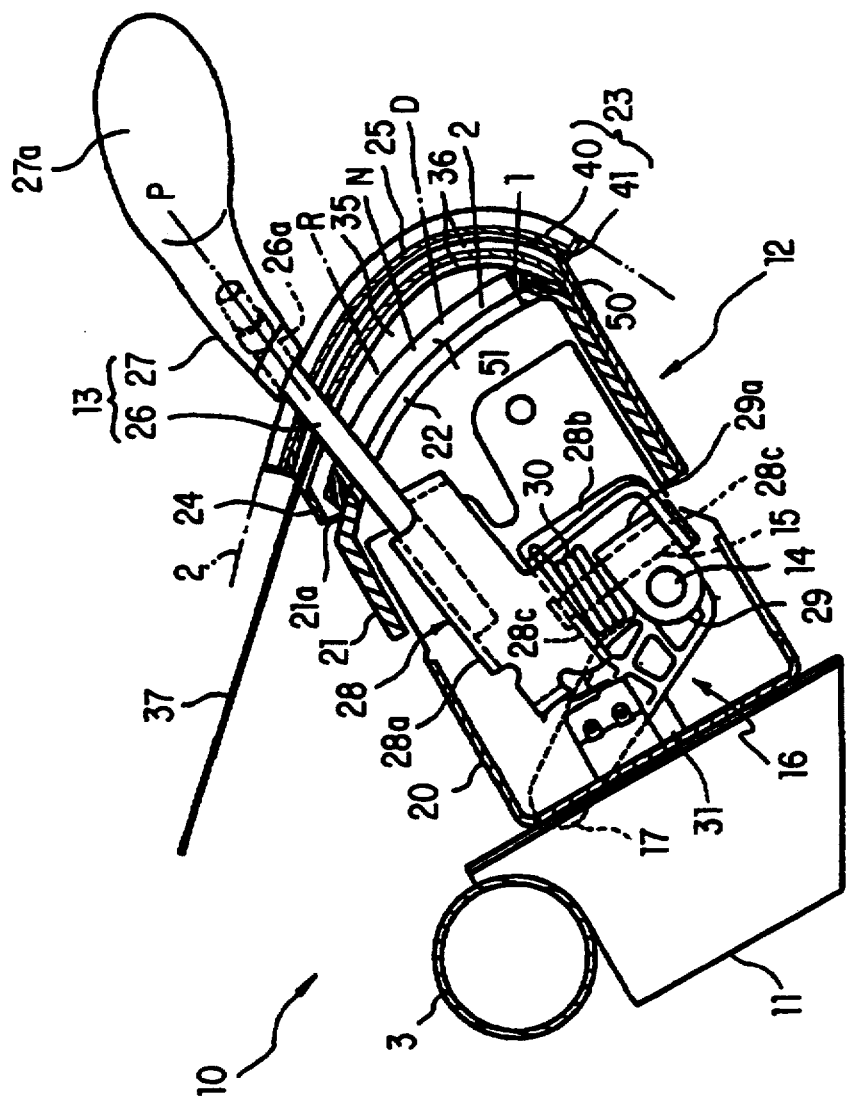
FIG. 4 is a vertical sectional view of the shift device.
Figure 5:
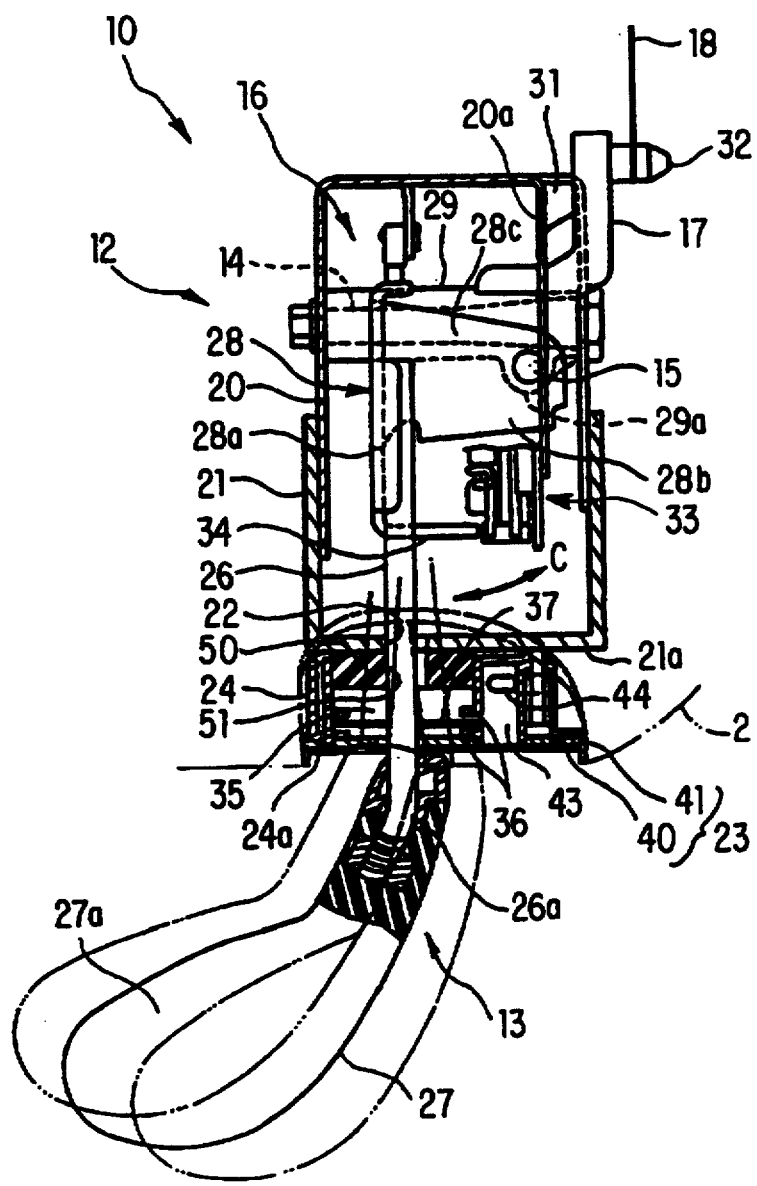
FIG. 5 is a cross sectional view of the shift device.

As shown in FIGS. 3–5, the lever mounting structure 16 has a lever support bracket 28 located within the front casing 20. The lever support bracket 28 is comprised by an elongated support member 28a which extends in the lengthwise direction and to which a front portion of the lever 26 is secured, and a generally U-shaped connecting member 28b which is secured to the lower end of the lever support bracket 28. This lever support bracket 28 is incorporated in the front casing 20. That is, there is a mounting sleeve 29 integrally formed with a bush 29a within the front casing. The axes of the sleeve 29 and the bush 29a are spatially perpendicular to each other. The mounting sleeve 29 is rotatably supported on a bush 29a by means of a second shaft 15. The mounting sleeve 29 is rotatably supported within the front casing 20 by the first shaft 14. The lever support bracket 28 is rotatably mounted on the bush 29a by means of the second shaft 15 passing through side walls 28c of the connecting member 28b. There is provided a coil spring 30 mounted on the second shaft 15 so as to urge the connecting member 28b in the clockwise direction indicated by an arrow C in FIG. 5.

Figure 8:
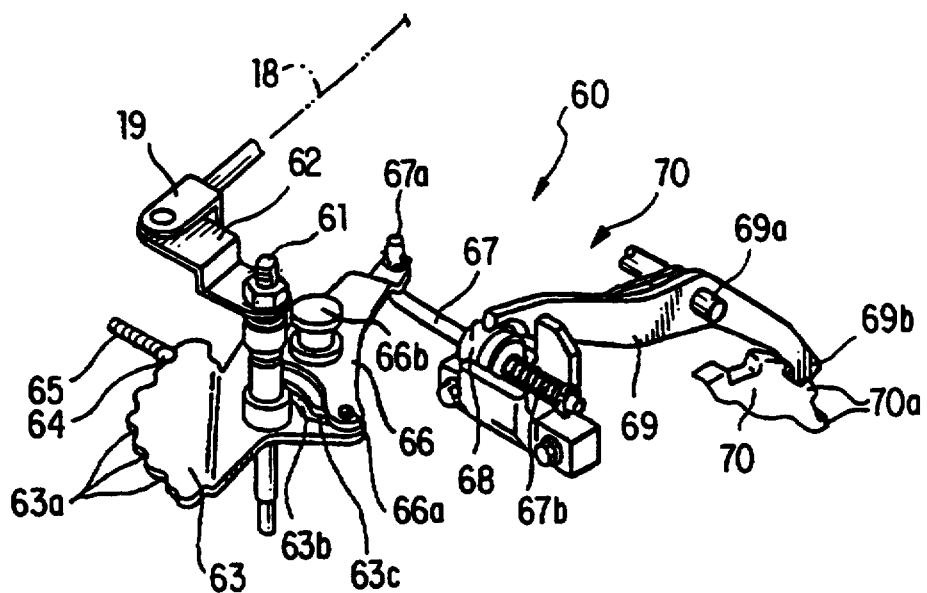
FIG. 8 is a perspective view of a shift valve actuator mechanism for the automatic transmission.

The output lever 17 of the lever mounting structure 16, which is formed integrally with, or otherwise secured to the mounting sleeve 29, extends laterally passing through an opening 31 formed in a side wall of the front casing 20. As clearly seen in FIGS. 2 and 4, the output lever 17 extends slanting forwardly upward. The push-pull wire 18 is retained at its one end by the output lever 17 through a connecting pin 32 secured to the output lever 17. As shown in FIG. 8, which illustrates a shift valve actuator mechanism 60, the push-pull wire 18 is retained at its another end by the connecting arm 19 of the shift valve actuator mechanism 60 which will be described in detail later.

The transmission shift device 10 has a lock mechanism provided in association therewith by which the operation of the transmission shift device 10 is restricted. The lock mechanism includes an electromagnetic actuator 33 secured to the internal wall 20a of the front casing 20 and a restriction arm 34 extending laterally from the support member 28a. The electromagnetic actuator 33 is energized to attract the restriction arm 34 when the dashboard shift lever 13 is in the position for the P range and the engine is actuated. The electromagnetic actuator 33 is deenergized so as to allow the shift operation of the dashboard shift lever 13 only when a brake pedal (not shown) is being depressed. This lock mechanism is well known in various forms in the art and may take any well known form.

Since the dashboard shift lever 13 is, as apparent from the above description, movable in two perpendicular directions around the first and second shafts 14 and 15, it is moved up and down and left and right within and along the guide slot 22 so as to be selectively located in desired positions, i.e. the P range, the R range, the N range, the D range, the 2nd range and the 1st range in order from upward to downward. By means of the coil spring 30, the lever 26 of the dashboard shift lever 13 is urged against the left side edge of the guide slot 22 to be held in any selected position when releasing the driver's hand therefrom. For safety, the guide slot 22 is formed with detents $22_P$ and $22_N$ in the positions for the P range and the N range, respectively, so as to allow the up and down movement of the dashboard shift lever 13 only when the dashboard shift lever 13 is intentionally pushed aside to the right. The operational power of the dashboard shift lever 13 necessary to pull out of the detent $22_N$ is defined by the coil spring 30. Specifically, the coil spring 30 is formed so as to allow the dashboard shift lever 13 to be moved up and down with a power less than approximately 10 to 15% of the average maximum arm muscular kinetic power available in the lateral direction.

Referring to FIG. 8, the shift valve actuator mechanism 60, which is operationally coupled to the shift device 10 by means of the push-pull wire 18 via the connecting arm 19, is provided so as to operate a shift valve (not shown) so as to selectively shift the transmission in accordance with the ranges selected by the shift device 10. Such a shift valve is well known in the art as a part of an hydraulic control circuit or system for the automatic transmission and takes any known form. The shift valve actuator mechanism 60 has a sector-shaped valve actuator disk 63 formed with detents 63a for the given ranges, i.e. the P, R, N, D, 2nd and 1st ranges, on its circular-arcuate periphery. If the dashboard shift lever 13 has a large stroke between the P range and the 1st range, the detents 63a are formed to become more shallower in order from the P range to the 1st range so as to decrease the operational power necessary to move the dashboard shift lever 13. Namely, the detent 63a for the P range is the deepest and the detent 63a for the 1st range is the shallowest.

For stopping the valve actuator disk 63 in the positions for the specific ranges of P, R, N, D, 2nd and 1st, there is provided a click-stop mechanism having a click-stop spring 65 and a click ball 64. This valve actuator disk 63 is secured to a lower portion of a rotary shaft 61. An input lever 62, pivotally connected to the connecting arm 19, is secured to an upper portion of the rotary shaft 61. Through the rotary shaft 61, up and down movements of the dashboard shift lever 13 are transmitted to the valve actuator disk 63. In association with the valve actuator disk 63, there is the shift valve for actuating the hydraulic control system so as to shift the automatic transmission 9 to the range that the dashboard shift lever 13 has selected.

The valve actuator disk 63 is formed with a circular-arcuate slot 63b having a center on the axis of the rotary shaft 61 and a cam slot 63c which is continuous from and extends away outward from the circular-arcuate slot 63b. Within the slots 63b and 63c, a cam follower pin 66a extending from one end of a crank lever 66 can slide. The crank lever 66, pivoted on a stationary shaft 66b, is operationally connected at its one end to the valve actuator disk 63 through the cam follower pin 66a and is pivoted at its other end on a pivot pin 67a at one end of an actuator rod 67 of a park-lock mechanism 70 for locking a park-lock gear 71. The park-lock mechanism 70 includes, in addition to the actuator rod 67, a peripheral cam 68 secured to the actuator rod 67 and a crank lever 69 which is pivoted on a pivot pin 69a and is formed at its one end with a hook 69b. The actuator rod 67 is urged by a spring 67b to be pushed out so as to turn the crank lever 66 in the counterclockwise direction as viewed in FIG. 8. When the actuator rod 67 is pushed out, the peripheral cam 68 is brought into under one end of the crank lever 69 so as to turn the crank lever 69 in the clockwise direction. The crank lever 69, when turning in the clockwise direction, brings its hook 69b into engagement with a tooth 70a of a park-lock gear 71. It is understood that the transmission shift device 10 and the shift valve actuator mechanism 60 may be connected to each other by means of an electrical means, such as an electrical solenoid, in place of the push-pull wire 18.

In operation of the shift valve actuator mechanism 60, any selection of range by the dashboard shift lever 13 turns the valve actuator disk 63 to actuate the shift valve so as to shift the automatic transmission 9 to the selected range. Whenever the dashboard shift lever 13 selects a range other than the park (P) range, the cam follower pin 66a slides within the circular-arcuate slot 63b, so as to keep the crank lever 66 unchanged in position. However, when the dashboard shift lever 13 selects the park (P) position, the cam follower pin 66a is guided by the cam slot 63c, so as to turn counterclockwise the crank lever 66. With the counterclockwise turn of the crank lever 66, the actuator rod 67 of a park-lock mechanism 70 is pulled forward such that the peripheral cam 68 pushes upward so as to turn the crank lever 69 clockwise. As a result, the hook 69b of the crank lever 69 is brought into engagement with a tooth 70a of the park-lock gear 71 of the park-lock mechanism 70.

Referring back to FIGS. 4–6, inside the ornamental face panel 23 there is a space 35. At lower right and left corners of the space 35 there are provided guide rails 36 curving convex to the car compartment along the frame wall 24a of the panel securing frame 24. The guide rails 36 guide a flexible concealing plate 37, which is formed as a rectangularly shaped web member approximately double as long as the space 35, so as to allow it to slide up and down. The concealing plate 37 is formed with a transverse slot 37a through which the lever 26 extends out and which allows the lever to move sideways. With the up and down movement of the dashboard shift lever 13, the concealing plate. 37 is moved up and down so that the inside of the panel securing frame 24 and/or the front and rear casings 20 and 21 is always concealed.

The rear wall 21a of the rear casing 21 is provided with an elastic cushioning member 50, made of formed urethane or synthetic rubber, located within the space 35 and attached to the back thereof (see FIG. 3). The elastic cushioning member 50 is formed with a slot 51 shaped similarly to the guide slot 22. By means of the elastic cushioning member 50, the lever 26 of the dashboard shift lever 13 urged by the coil spring 30 is prevented from making sound when it hits the edge of the guide slot 22 during shifting. In addition, the elastic cushioning member 50 absorbs impact energy caused by a secondary collision of the driver against the ornamental face panel 23 during a frontal collision of the vehicle.

Figure 6:
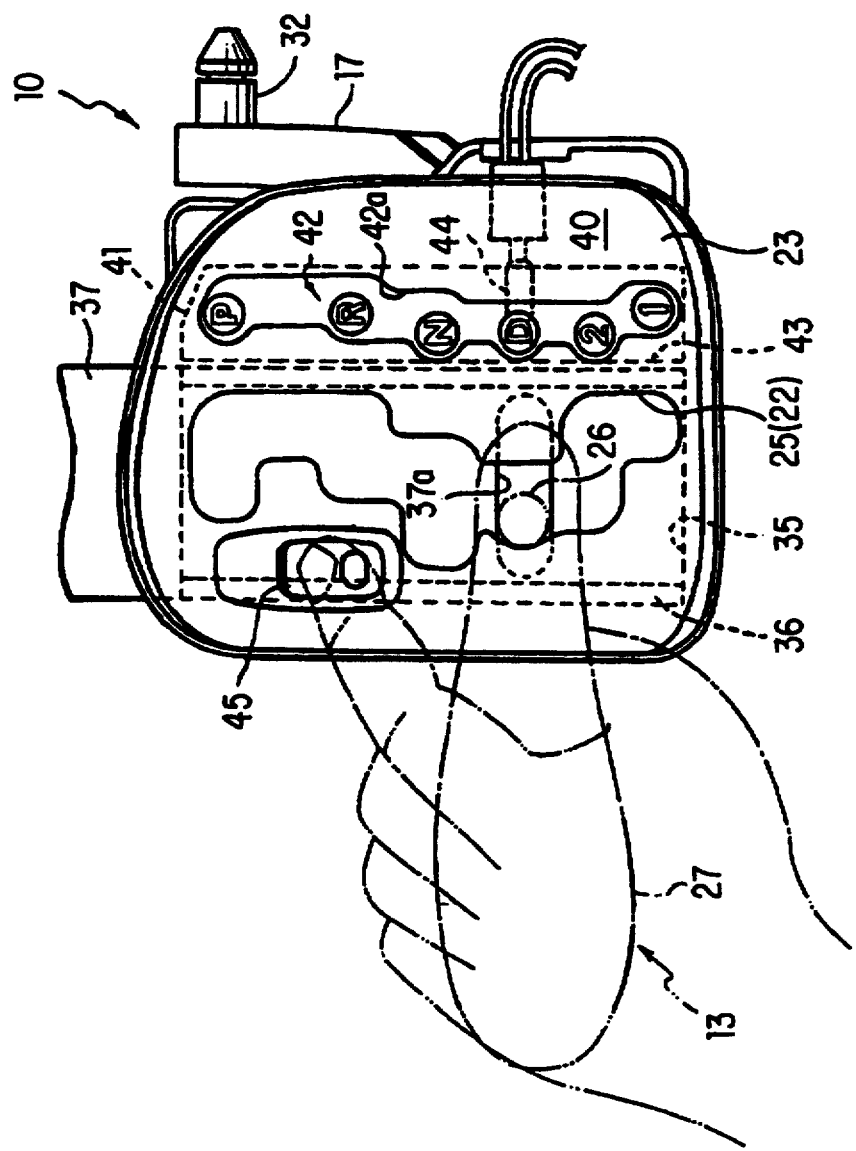
FIG. 6 is a front view of the shift device.

The ornamental face panel 23 has a semi-transparent face panel 40 made of synthetic resin material and a base plate 41 disposed inside the face panel 40. The base plate 41 is provided with a range indicator means 42 for indicating selected ranges by the dashboard shift lever 13. The range indicator means 42 includes a slot area 42a outlined in a simplified shape similar to the guide slot 22, a light guide opening 43 exposing to the slot area 42a and a lamp 44 disposed within the light guide opening 42. Within the slot area 42a the semi-transparent face panel 40 is printed with symbols, e.g. P, R, N, D, 2 and 1 which correspondingly indicate the ranges of P, R, N, D, 2 and 1, located to correspond to the respective positions of P, R, N, D, 2 and 1 of the guide slot 25. Each symbol is encircled by a transparent circular area. The lamp 44 is secured to the panel securing frame 24 adjacent to where the symbol of the drive range D is provided. As shown in FIG. 6, on the opposite side to the range indicator means 42 with respect to the guide slot 25, the ornamental face panel 23 is provided with a hold switch 45 which is located such that it is easily reached by a left index finger and/or a left middle finger while the driver holds the knob 27 of the dashboard shift lever 13 in any position of the drive, second and first ranges with his or her left hand if the vehicle is for right-hand steering.

Feeling and a necessary power of operation of the dashboard shift lever 13 will be described hereafter.

The transmission shift device 10 is designed and adapted such that the dashboard shift lever 13 is operated with the same operational feeling as that of stick shift levers or floor shift levers for shifting the same type of automatic transmissions as the automatic transmission 9. In addition, the dashboard shift lever 13 is also designed and adapted such that it can be operated with a vertical power within approximately 10 to 15% of an average maximum muscular kinetic power of arms available in vertical direction of average drivers which is between approximately 1.0 and 1.5 kgw. In order to realize the appropriate feeling of operation of the dashboard shift lever 13, the lever ratio between the input and output levers 17 and 62 and/or the spring constant of the click-stop spring 65 are appropriately established. As was previously described, the dashboard shift lever 13 has a large stroke between the P range and the 1st range, and the detents 63a are formed to become more shallower in order from the P range to the 1st range, the operational power necessary to move the dashboard shift lever 13 is established between approximately 15 and 10% of a maximum muscular kinetic power of arm available in vertical direction of an average driver during driving which is between approximately 1.5 and 1.0 kgw.

The operation feeling and operation power described as above are determined as a result of studies of various operational factors.

Factors affecting on shift operation of the shift lever 13 experienced by drivers includes mechanical or physical factors of the shift lever 13 and human characteristics of drivers. For example, mechanical factors include the distance of shift lever 13 from the steering wheel 8 (Factor I), the vertical position of shift lever 13 (Factor II), the easiness of exerting a power on the shift lever 13 (Factor III), a necessary power to operate the shift lever 13 (Factor IV), the position and motion of hand (Factor V), the space left between the shift lever and a wiper actuation lever (Factor VI). These factors closely correlate to human characteristics, such as physical characteristics, physiological characteristics and mental characteristics.

Referring to FIG. 9, very serious relations between the physical factors of the shift lever 13 and the human factors of drivers are indicated by circles. Numbers in parentheses designate the order of analyses. The following analyses were conducted in specified ways or procedures by the aid of various instruments shown in right columns. The resultant data were based on analyses applied to ten average drivers.

Figure 10:
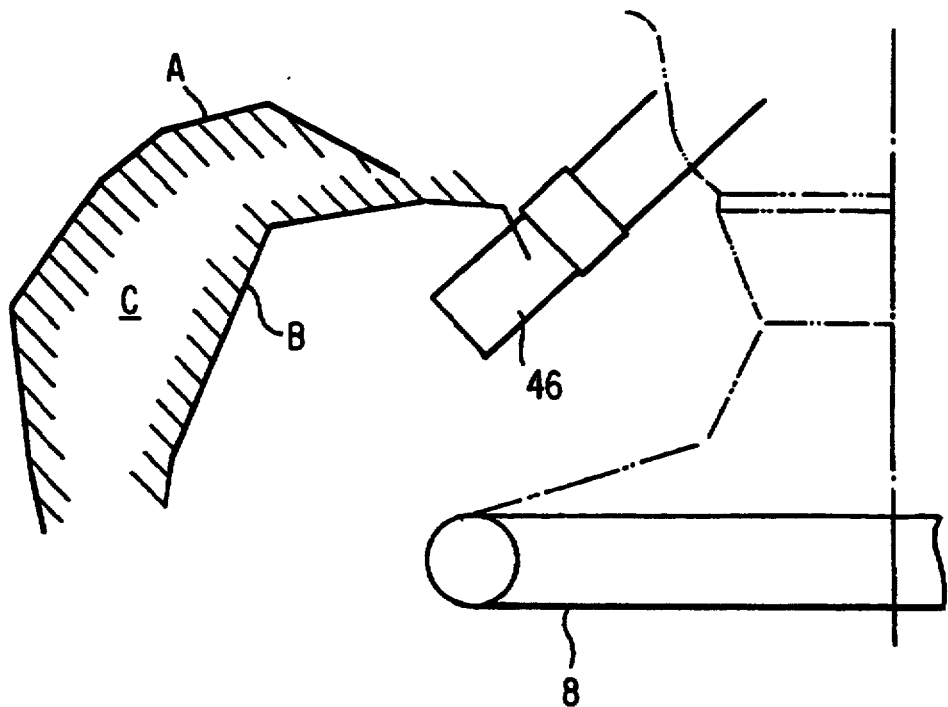
FIG. 10 is an illustration showing an appropriate horizontal area in which the shift lever is located.

From the result of a motion analysis by a video camera, concerning the distance of shift lever 13 from the steering wheel 8 (Factor I) and the space between the shift lever and the wiper actuation lever (Factor VI), it was found that the knob 27 of the shift lever 13 was desirably disposed within an area C defined between an extreme far line A and an extreme close line B as drawn on a scale of approximately 40% of actual geometry in FIG. 10. If beyond the extreme line A, the knob 27 is too far from the steering wheel 8 to be operated conveniently. If beyond the extreme line B, the knob 27 is too close from the wiper lever actuation lever 46 to be operated conveniently.

Figure 11:
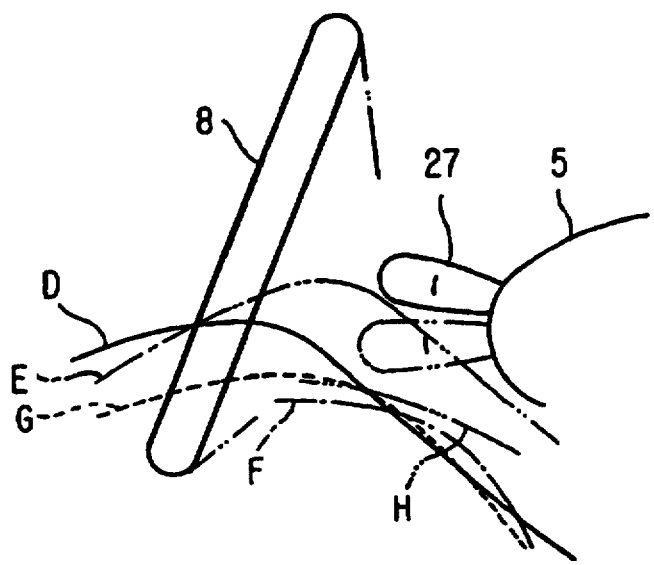
FIG. 11 is an illustration showing an appropriate vertical area in which the shift lever is located.

From the result of an analysis, concerning the vertical position of shift lever 13 (Factor II), it was found that the knob 27 of the shift lever 13 was disposed above at least a line D which indicates a contour of a left leg of the driver when the driver operates a parking or side brake lever (not shown) with the foot separated from a brake pedal as drawn on a scale of approximately 20% of actual geometry in FIG. 11. Lines E, E, G and H indicate, respectively, contours of left leg positions of the driver when the driver bends up the left leg for rest, when the driver stretches the leg for rest, when the driver sits on a front portion of the seat for rest, and when the driver gets in or out the vehicle, respectively.

Figure 12:
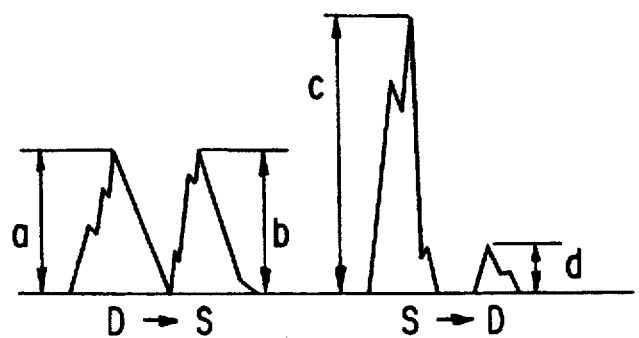
FIG. 12 is an electromyogram in the form of integrated wave-form when operating shift lever.
Figure 13:
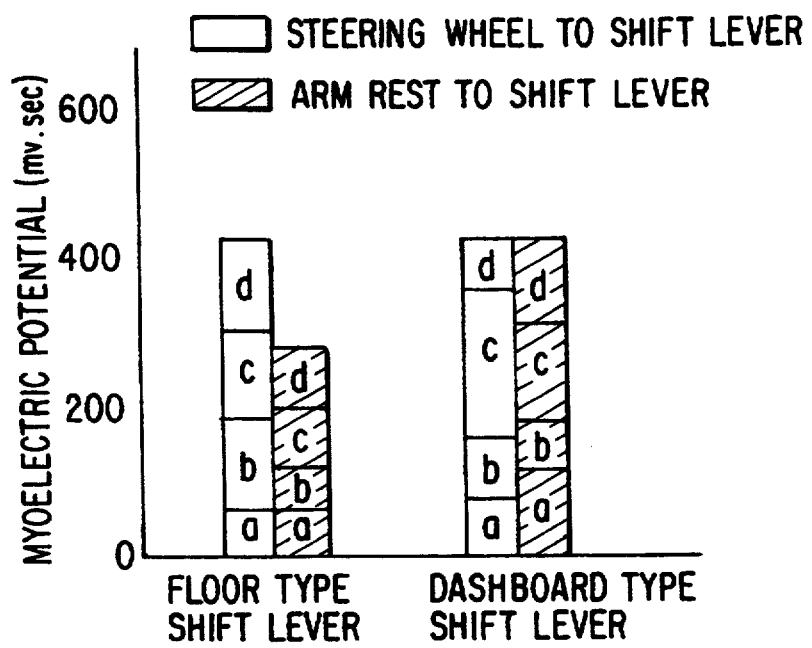
FIG. 13 is a graph showing myoelectric potentials for shift operations of the dashboard shift lever and the floor shift lever.

The result of an analysis, concerning the easiness of exerting a force on the shift lever 13 (Factor III) which is closely related to the feeling of shift operation and fatigue is shown in FIGS. 12 and 13. FIG. 12 shows electromyogram in the form of integrated wave-forms when the shift lever 13 is pushed up and down by a left hand so as to shift the automatic transmission 9 from the drive (D) range to the second (S) range, and in the reverse direction, i.e. from the second (S) range to the drive (D) range. FIG. 13 is a graph showing myoelectric potentials for shift operations of the dashboard shift lever 13 and the floor shift lever. In FIG. 13, there are shown electromyographic voltages for when the driver moves his or her left hand from the steering wheel 8 to the shift lever 13 for shift operation and when he moves it from a center arm rest to the shift lever 13 for shift operation, respectively, for each of the dashboard shift lever and the floor shift lever. As clearly understood from FIG. 13, when the driver moves his or her left arm from the steering wheel 8 to the shift lever 13 for shift operation, there is no difference in electromyographic voltage necessary for shift operation between the dashboard shift lever and the floor shift lever. This means that there is no difference of the feeling of shift operation between both the dashboard shift lever and the floor shift lever.

Figure 14:
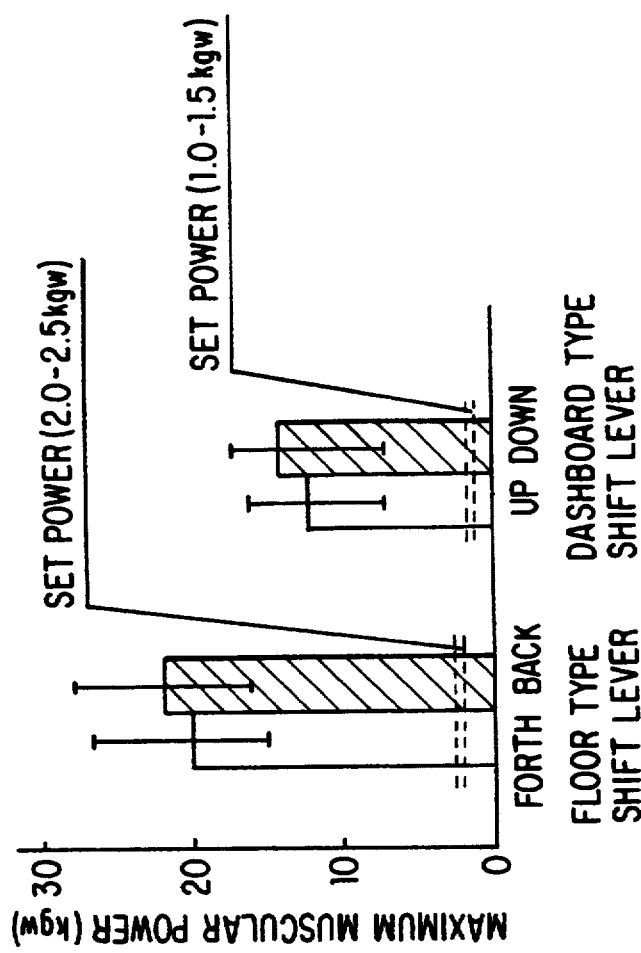
FIG. 14 is a graph showing maximum muscular power when operating shift levers.
Figure 15:
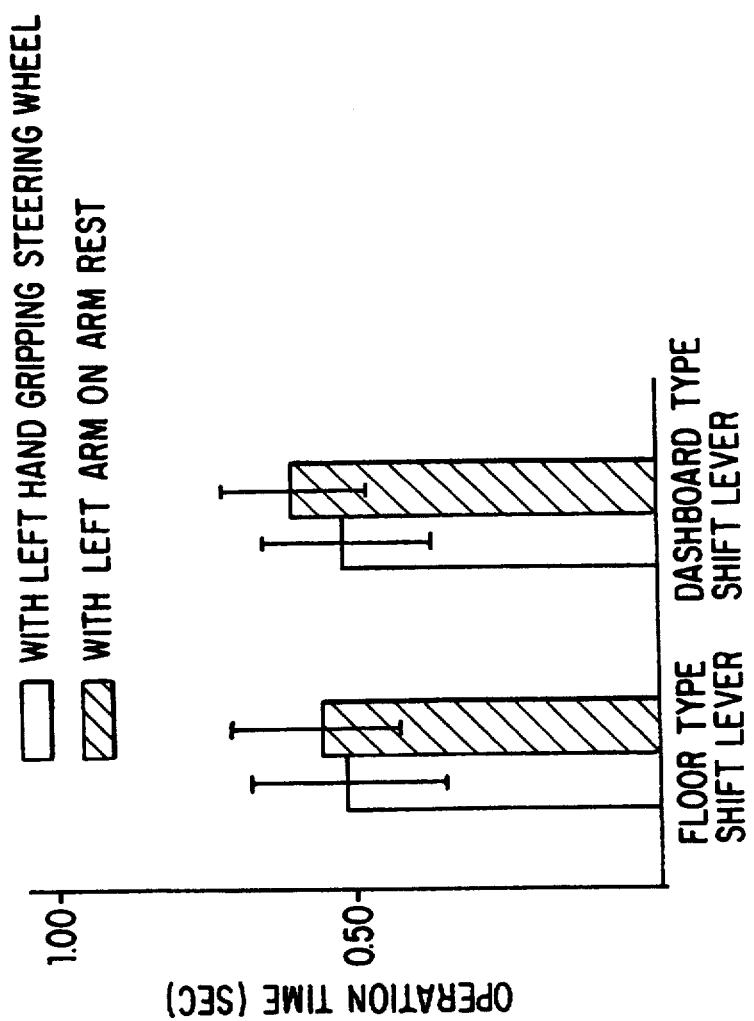
FIG. 15 is a graph showing operation time of the shift levers.

The operational power necessary to operate the shift lever 13 (Factor IV) is also closely related to the feeling of shift operation, which is shown in FIG. 14. In FIG. 14, average available maximum arm powers for up and down shift operations and push and pull shift operations are depicted. The average maximum arm power available to operate floor shift levers of various models of vehicles was between 20 and 22 kgw, and the average power necessary to operate the floor shift levers was between 2.0 and 2.5 kgw, which is approximately 10 to 15% of the average maximum arm muscular kinetic power available in horizontal direction. On the other hand, the average maximum arm power available to operate dashboard shift levers of various models of vehicles was between 12 and 14 kgw. Accordingly, the power with which the dashboard shift lever 13 is operated is established to approximately 10 to 15% of the average maximum muscular kinetic arm power, i.e. between approximately 1.0 and 1.5 kgw, available in vertical direction. Furthermore, an operation time analysis was made concerning the position and motion of hand (Factor V), the result of which is shown in FIG. 15. An operation time necessary to finish a shift operation of the shift lever 13 is defined as a total time of a reaction time which the driver needs before starting of a motion of his or her left hand in response to the his or her decision-making in his or her cerebellum, an approach time which the driver needs to move his or her left hand from the steering wheel to the shift lever 13 after the start of motion of the left hand, and an actual operation time which the driver needs to complete a shift operation of the shift lever 13. As shown, an average operation time for the dashboard shift lever 13 was approximately 0.5 seconds as well as for floor shift levers of various models of vehicles.

Figure 16:
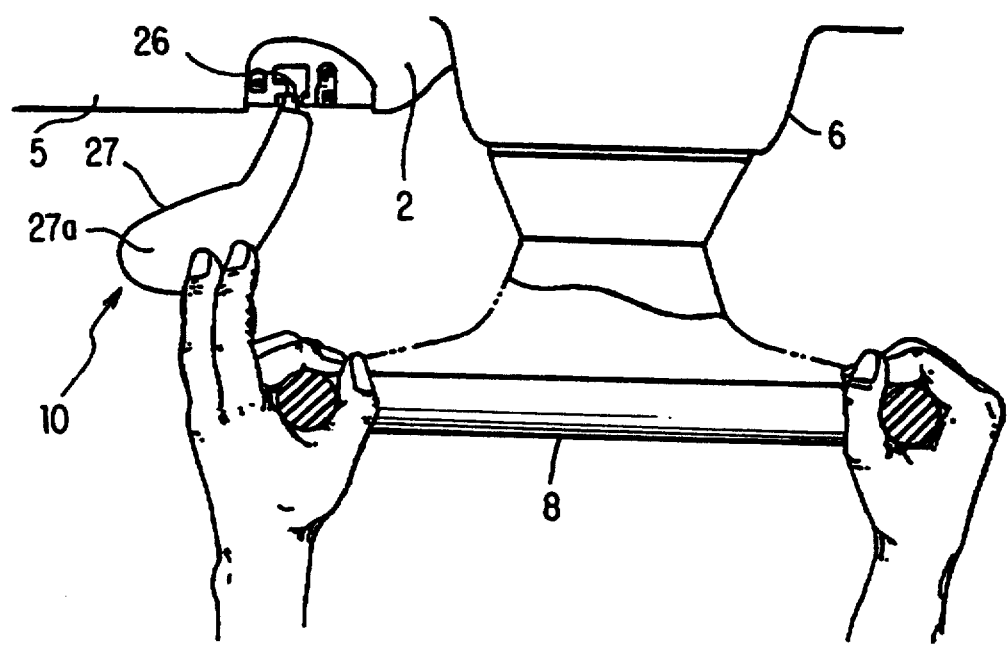
FIG. 16 is a schematic plan view showing the arrangement of the shift lever and a steering wheel.

As shown in FIG. 16, since the dashboard shift lever 8 is located near the left extreme of the steering wheel 13 and extends into the car compartment, the dashboard shift lever 13 is quite easily operated by the left index finger and/or the left middle finger of the left hand of the driver who operates the steering wheel 8. Otherwise, if the driver operates the steering wheel 8 by his or her right hand only, the dashboard shift lever 13 is more easily operated by the left index finger and/or the left middle finger of the left hand released from the steering wheel 8. In addition, since the feeling of the dashboard shift lever 13 is quite similar to ordinary floor shift levers, the vehicle provided with the dashboard shift lever 13 of the present invention provides the same drivability as ordinary vehicles having floor shift levers. Furthermore, since the dashboard shift lever 13 is operable with a vertical power within approximately 10 to 15% of an average maximum arm muscular kinetic power available in vertical direction, it provides the same feeling of operation as the ordinary floor shift levers which are operable with horizontal powers within approximately 10 to 15% of an average maximum arm muscular kinetic power available in horizontal direction.

Although the automatic transmission shift device of the present invention has been described with respect to a car for right-hand steering, it can be installed in cars for left-hand steering with the same results.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. In a shift device, for an automatic transmission of an automotive vehicle, which has a shift lever extending from a dashboard toward near a transverse extremity of a steering wheel and being movable at least on an arcuate line in a vertical direction to shift said automatic transmission into a plurality of ranges including at least a park range and a reverse range, the improvement comprising means for mounting said shift lever for movement up and down in said vertical direction with a vertical operational power between approximately 10 and 15% of an average maximum muscular kinetic power actively available in said vertical direction of arms of average drivers.

2. A shift device as defined in claim 1, wherein said vertical operational power decreases with an increase in down movement of said shift lever.

3. A shift device as defined in claim 1, further including means for mounting said shift lever for movement in a transverse direction and with a transverse operational power higher than said vertical operational power.

4. A shift device as defined in claim 3, wherein said transverse operational power is between approximately 10 and 15% of an average maximum muscular kinetic power actively available in said transverse direction of arms of average drivers.

5. A shift device as defined in claim 4, wherein said means for mounting said shift lever for movement in the transverse direction is operative between a park range and a reverse range.

6. A shift device, for an automatic transmission of an automotive vehicle, comprising:
a shift lever extending from a dashboard toward near a transverse extremity of a steering wheel and being movable at least up and down on an arcuate line in a vertical direction to shift said automatic transmission into a plurality of ranges including at least a park range and a reverse range;
connecting means for operationally connecting said shift lever with said automatic transmission; and
operational power setting means, provided between said shift lever and said automatic transmission, for establishing a vertical operational power between approximately 10 and 15% of an average maximum muscular kinetic power actively available in the vertical direction of arms of average drivers with which said shift lever is moved up and down.

7. A shift device as defined in claim 6, wherein said operational power setting means varies said vertical operational power so as to decrease with an increase in down movement of said shift lever.

8. A shift device as defined in claim 6, including means for moving said shift lever in a transverse direction and with a transverse operational power higher than said vertical operational power.

9. A shift device as defined in claim 8, wherein said transverse operational power is between approximately 10 and 15% of an average maximum muscular kinetic power actively available in said transverse direction of arms of average drivers.

10. A shift device as defined in claim 8, wherein said shift lever is movable in the transverse direction between the park range and the reverse range.

11. A shift device as defined in claim 6, wherein said operational power setting means includes a rotative disk which is turned by up and down movement of said shift lever for shifting the automatic transmission to any selected one of the ranges, and a click stop mechanism for releasably holding said rotative disk in position for each of the ranges.

12. A shift device as defined in claim 11, wherein said click stop mechanism includes a click detent for each of the ranges formed on a periphery of said rotative disk and a click ball urged against said detent.

13. A shift device as defined in claim 11, wherein said click detents are formed to become more shallower in order from the park range.

14. In a shift device, for an automatic transmission of an automotive vehicle, which has a shift lever extending from a dashboard toward near a transverse extremity of a steering wheel and being movable at least on an arcuate line in a vertical direction to shift said automatic transmission into a plurality of ranges including at least a park range and a reverse range, the improvement comprising means for mounting said shift lever for movement up and down in said vertical direction with a vertical operational power between approximately 1.0 and 1.5 Kgw.

15. A shift device as defined in claim 14, wherein said vertical operational power decreases with an increase in down movement of said shift lever.

16. A shift device as defined in claim 14, and further including means for mounting said shift lever for movement in a transverse direction with a transverse operational power higher than said vertical operational power.

17. A shift device as defined in claim 16, wherein said transverse operational power is between approximately 1.0 and 1.5 Kgw.

18. A shift device as defined in claim 16, wherein said means for mounting said shift lever for movement in the transverse direction is operative between the park range and the reverse range.

19. A shift device, for an automatic transmission of an automotive vehicle, comprising:
a shift lever extending from a dashboard toward near a transverse extremity of a steering wheel and being movable up and down on an arcuate line in a vertical direction to shift said automatic transmission into a plurality of ranges including at least a park range and a reverse range;
connecting means for operationally connecting said shift lever with said automatic transmission; and
operational power setting means, provided between said shift lever and said automatic transmission, for establishing a vertical operational power between approximately 1.0 and 1.5 Kgw.

20. A shift device as defined in claim 19, wherein said operational power setting means varies said vertical operational power so as to decrease with an increase in down movement of said shift lever.

21. A shift device as defined in claim 19, and further including means for moving said shift lever in a transverse direction with a transverse operational power higher than said vertical operational power.

22. A shift device as defined in claim 21, wherein said transverse operational power is between approximately 1.0 and 1.5 Kgw.

23. A shift device as defined in claim 21, wherein said shift lever is movable in the transverse direction between the park range and the reverse range.

24. A shift device as defined in claim 19, wherein said operational power setting means includes a rotative disk which is turned by up and down movement of said shift lever for shifting the automatic transmission to any selected one of the ranges, and a click stop mechanism for releasably holding said rotative disk in position for each of the ranges.

25. A shift device as defined in claim 24, wherein said click stop mechanism includes a click detent for each of the ranges formed on a periphery of said rotative disk and a click ball urged against said detent.

26. A shift device as defined in claim 25, wherein the click detents are formed to become more shallow in order from the park range.

* * * * *